United States Patent

[11] 3,602,255

[72] Inventor Arthur E. Bishop
 24 Brinker Road, Barrington, Ill. 60010
[21] Appl. No. 7,013
[22] Filed Jan. 30, 1970
[45] Patented Aug. 31, 1971

[54] POWER STEERING VALVE SYSTEM
 10 Claims, 5 Drawing Figs.
[52] U.S. Cl. ................................................. 137/560,
 137/625.24, 91/375
[51] Int. Cl. ....................................................... F16k 11/02,
 F15b 9/10
[50] Field of Search ........................................... 137/560, -
 625.21–625.24; 91/375

[56] References Cited
UNITED STATES PATENTS
3,138,069 6/1964 Bishop .......................... 91/375
3,145,626 8/1964 Vickers et al. ................. 137/625.24 X
3,296,940 1/1967 Eddy et al. ..................... 137/625.24 X Primary Examiner—Henry T. Klinksiek
Attorney—Hill, Sherman, Meroni, Gross & Simpson ABSTRACT: A minimum slack connection between the steering shaft, power steering valve components, and steering gear worm, in which limited universal motion is permitted to accommodate manufacturing tolerances without interference with precise steering control; and incorporating provision against application of axial pressures to the steering components in response to power steering hydraulic pressures in the system.

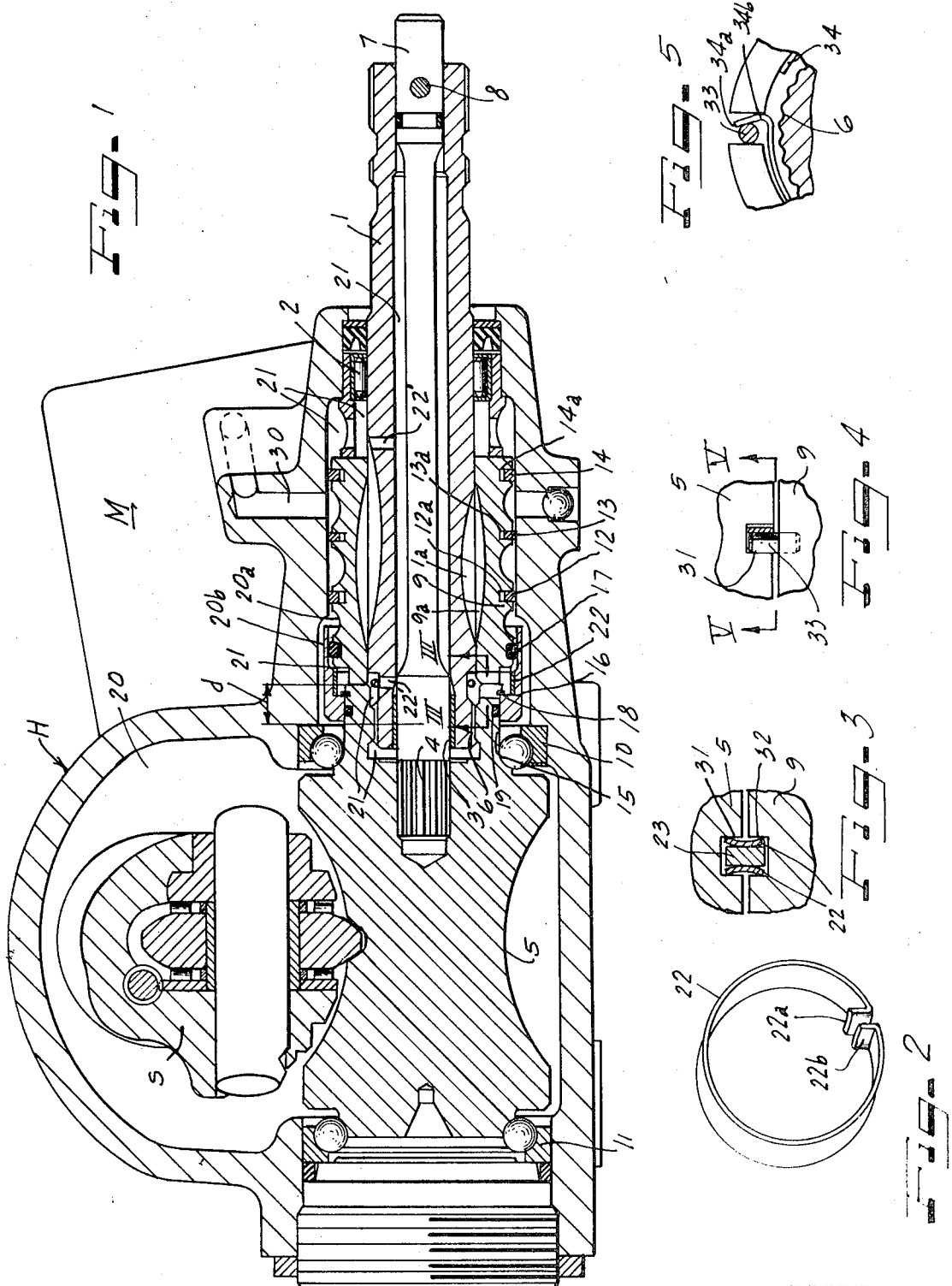

POWER STEERING VALVE SYSTEM

BACKGROUND OF THE INVENTION

As those familiar with the field of automatic steering are aware, manufacturing tolerances required to successfully compete in the manufacture of steering gear in the mass production market pose serious problems where precise steering valve control is necessary. In modern vehicles, a constant problem of compactness has occurred. The vehicle engine space has been consistently decreasing in order to provide a low vehicle profile while at the same time the size of the engine fitted into the space has increased. As a result of this situation, space within the engine compartment has become small and, accordingly, steering gear components which are to reside in that space must be made as compact as possible. A reduction in steering gear size has been attempted through reduction of bearing sizes, in highly specialized gear tooth forms and in the integration of the power motor to the steering gear housing. With the achievement of size reductions, problems of sealing and proper drive connection between the various parts, capable of nonbinding operation in spite of extremely close tolerances, have arisen. It has been found to be of crucial importance that slack be reduced to a point as close as zero as possible and that relatively movable, highly sophisticated, power steering valve parts be operable without binding under the same circumstances. In accordance with the present invention, such a valve system is successfully provided.

SUMMARY OF THE INVENTION

In accordance with the present invention, a steering wheel shaft is provided in driving connection with a gear reduction device through a spring-centered lost-motion connection. A power steering valve of two relatively rotatable components is provided, one component of which is secured to the steering shaft and the other of which is secured to the gear reduction device. In a preferred form of the invention, an hourglass worm and roller follower is employed as the reduction system. The hourglass worm is coaxial with the steering shaft and is driven by the steering shaft by way of a coaxially mounted torsion bar and a lost motion spline connection such that rotation of the steering shaft will turn the worm by way of the torsion bar until such time as torque is applied at the steered wheels to resist turning of the worm, at which time the torsion bar deflects. Deflection beyond a predetermined limit is prevented by the splines, at which point a direct mechanical connection is provided between the steering shaft and the hourglass worm. The relative motion accommodated by the torsion bar and spline connection is employed for power steering purposes. The steering shaft rigidly carries an inner valve core which mates with an outer valve sleeve drivingly connected to the worm. Accordingly, relative motion between the worm and the steering shaft, as above described, causes relative motion between the valve core and valve sleeve.

In a preferred arrangement of power steering motor and steering gear reduction mechanism, the hydraulic pressure applied to one side of the power steering motor is applied substantially throughout the hourglass worm and roller portion of the housing. Any effect of this pressurization must be kept from the valve parts. In accordance with the present invention, a novel sleeve and seal combination is provided for connecting the hourglass worm and the valve sleeve in a manner isolating the end of the valve sleeve from any oil pressure forces. At the same time, the hourglass worm and sleeve are provided with a novel slack-free connection incorporating constant spring bias and permitting slight axial misalignment between the hourglass worm and the valve sleeve without binding. In accordance with the present invention, unbalanced pressure forces against the valve sleeve are avoided and, at the same time, slight universal motion is provided in driving the valve sleeve from the worm, all in a compact manner.

DESCRIPTION OF THE DRAWINGS

FIG. 1 is a plan view, shown in cross section, of an integral power steering gear constructed in accordance with the present invention;

FIG. 2 is an isometric view of a drive spring employed in the structure of FIG. 1;

FIG. 3 is an enlarged cross-sectional view taken along the line III—III of FIG. 1;

FIG. 4 is a modified form of drive connection taken along the section line III—III of FIG. 1; and FIG. 5 is a cross-sectional view taken along the line V—V of FIG. 4.

DETAILED DESCRIPTION

As can be seen from a study of FIG. 1, an input steering shaft 1 is rotatably mounted in the steering gear housing H in a needle bearing 2 and at its remote end on the torsion bar 7 by way of a sleeve bearing 3. The steering shaft 1 is splined at 6 to a steering worm 5 by way of a lost motion spline permitting, for example, approximately 9° of travel away from a centered condition in either direction before providing a positive drive. The torsion bar 7 is serrated at 4 and is forced into worm 5 providing a permanent, rigid drive connection between the torsion bar 7 and the worm 5.

After assembly of the torsion bar 7 into the worm 5 and shaft 1 and following bench alignment of the outer valve sleeve 9, the torsion bar 7 and shaft 1 are drilled and pinned as at 8. From that point in construction, rotation of the steering shaft 1 will drive the worm 5 through the torsion bar 7 until the torsion bar deflects as a result of a transfer of torque to a point at which the slack in the loose spline connection 6 is taken up and a positive drive at the spline occurs.

The valve sleeve 9 floats rotationally on the steering shaft 1, which comprises the inner valve core, with a very close tolerance, ordinarily in the range of 0.0002 inch to 0.0006 inch clearance. The alignment of the sleeve 9 within the housing H and with respect to the worm 5 is dependent upon a number of factors including the alignment of the ball bearing races 10 and 11 carrying the worm 5 and the bearings 2 and 3 carrying the steering shaft 1. In manufacturing procedures, misalignments can occur in the overall, due to the addition of a number of factors. For example, the deflection of the bearings under load and the slight variations in clearances in plain bearings such as bearing 3 can cause substantial misalignments in the finished product. Since these misalignments can occur, a clearance of approximately 0.012 inch on the diameter is allowed between the sleeve 9 and the housing H. TEFLON rings 12, 13 and 14 are carried, respectively, in annular grooves 12a, 13a and 14a to accommodate this misalignment without oil leakage between the valve ports.

In the system shown, a power motor M is provided with a reciprocal power piston cooperating with the cross-shaft S by way of a rack and sector connection, not shown. The power motor M is pressurized at one end via port 30 and at the other end via the open housing space 20 and valve groove 20a via passage 20b past the worm 5 through the ball bearing 10. Accordingly, the pressure in the area 20 will vary from sump pressure in the system to the maximum oil pressure employed in steering the vehicle. On the other hand, pressure in the areas 21 of the valve system will be at low sump pressure at all times. In these circumstances, it is important that the pressure acting at the right-hand end of the sleeve, as viewed in FIG. 1, be substantially the same as the pressure acting at the left-hand end of the sleeve 9. It is necessary, accordingly, to isolate the pressure in the passage 20b from acting against the left-hand end of the sleeve 9, thereby preventing any binding action between the sleeve 9 and the race accommodating the bearing 2.

In accordance with the present invention, isolation is provided by way of a sleeve 16. The sleeve 16 comprises an annulus, preferably of metal, which is rotatably mounted on worm 5 and is sealed with respect to sleeve 9 by way of an O-ring or similar seal 17. As a result of the seals 17 and 19, oil pressure from the space 20a, 20b is prevented from entering the connection between the worm 5 and the valve sleeve 9. At the same time, the O-rings 17 and 19 permit slight axial misalignment between the worm 5 and the sleeve 9 without disruption of the seal or without binding relationship. In the embodiment illustrated, it will be observed that the diameter 15 of the worm 5 upon which the ball bearing is carried, and upon which the sleeve 16 is journaled, is of smaller diameter than the outside diameter of the sleeve 9 upon which the sleeve 16 is journaled. Accordingly, when the pressure in space 20 is high, a resultant bias will urge the sleeve 16 toward the right as viewed in FIG. 1 unless restrained. Restraint is provided by an annular metal-retaining ring 18 carried by the worm 5. Movement of the sleeve 16 cannot occur toward the right beyond the ring 18 and, as a result, pressures resulting from the elevated pressure in space 20 can in no way affect an axial pressure against sleeve 9 toward the right, and the sleeve 9 remains pressure-balanced by the pressure of sump space 21. Vents 22' in the shaft 1 similarly assure equalization of all of the areas 21 to the sump pressure.

As a result of the sleeve construction above described, the diameter of the worm 5 which may be supported by the bearing 10 can be substantially reduced and an end-to-end or face-to-face drive relationship may be provided between the worm 5 and the sleeve 9 while at the same time eliminating unbalanced pressures on the sleeve 9. In prior art systems, the sleeve 9 has sometimes been axially embedded into the worm 5 to prevent the application of unbalanced pressures on the sleeve; but such an arrangement has required substantially larger diameter bearings with, accordingly, a substantial increase in overall steering gear dimension.

The drive connection between the worm 5 and sleeve 9 is quite critical. An axial misalignment, or radial shift, of approximately 0.004 inch between the valve sleeve 9 and the worm 5 at their axial interface results in about one-half degree angular change, or a resulting variation in manual effort at the steering wheel rim of approximately one pound. A bias to right or left, of one-quarter of this amount can be discerned by the driver and can be objectionable to him. Preferably, the slots 31 and 32 in the worm 5 and sleeve 9, respectively, are milled to a width of approximately ¼ inch +0.003 inch −0.000 inch and a spring coupling member 22 is so formed that its ends lock into these slots tightly without respect to the width of the slot. Precision of the actual angular relationship between the valve sleeve 9 and the core 1 is, as above mentioned, relatively unimportant since the torsion bar 7 is pinned to the shaft 1 in an exact trim balanced condition within the valve sleeve 9 at the final bench assembly. The spring 22 is shown by itself in FIG. 2 and it will be observed that the ends 22a, 22b of the spring are bent into a curved configuration shown in FIG. 3 such that upon assembly of the device with a filler block 23 positioned between the ends 22a, 22b, the slots 31, 32 are substantially completely filled in a resilient manner by the spring, independently of slight variations in slot width. With this connection, slight universal motion may occur between the worm 5 and the sleeve 9 and such universal motion is taken up by resiliency of the spring 22. At the same time, no slack is provided in the connection so that steering in all cases is firm and without valve flutter.

A revised embodiment of the device for providing a slack-free connection between the valve worm 5 and the sleeve 9 is shown in FIGS. 4 and 5. FIG. 4 as noted above, illustrates a revision, as viewed along the same cross-sectional lines III—III taken in FIG. 1. Instead of providing a pair of opposing, face-to-face slots and a filler block 23, however, the worm 5 is provided with a slot 31 and sleeve 9 is provided with a round pin 33. The slot 31 may retain its original dimension and in such case the pin comprises approximately three-sixteenth inch diameter. The space between the pin 33 and the slot 31 is resiliently filled by a flat spring 34 of a thickness approximately 0.055 inch having a sharp reverse bend 34b such that the free end of the spring 34a acts against the pin 33 and the inner end 34b cooperates with the slot 31 forcing the pin 33 hard against the side of the slot at all times. This connection provides a positive, exact, relative position between the sleeve 9 and the worm 5 at all times, but simultaneously permits resilient misalignment during rotation.

In the embodiments shown in FIGS. 1 and 4, the point of connection between the worm 5 and the sleeve 9 is axially outboard of the bearings 10, 11 of the worm 5. Manifestly, the further the distance outboard of the bearings 10 and 11 this face-to-face connection is located, the greater the misalignment error will be as a result of any misalignment between the axes of the worm 5 and the shaft 1. Accordingly, it is desired that the interface coupling between the worm 5 and the sleeve 9 be positioned as close to the bearing 10 as practicable, as it has, in fact, been placed in the illustrated embodiment.

It will be seen from the above description that I have provided a novel and highly effective connection between the valve sleeve and the worm of a power steering system. This connection prevents unbalanced hydraulic pressures from being applied to the valve sleeve and provides a positive slack-free drive connection between the worm and the valve sleeve which accommodates slight misalignment without binding and with substantially consistent accuracy. Variations may be made in the structure without departing from the scope of the novel concepts of this invention and it is, accordingly, my intent that the scope of the invention be limited solely by that of the hereinafter appended claims.

I claim:

1. In combination in an integral rotary-valve power steering gear having a gear reduction member drivingly connected to a power steering valve sleeve member and wherein varying hydraulic pressures are applied to the gear reduction member in the area adjacent said connection, the improvement comprising a sleeve surrounding both said gear reduction member and said valve sleeve member adjacent their point of connection and resiliently sealed to both members by annular resilient sealing means permitting slight misalignment.

2. The structure set forth in claim 1 wherein said resilient seal means comprise annular rings of resilient material.

3. The structure set forth in claim 1 wherein restraining means are provided preventing axial movement of said sleeve with respect to said gear reduction member in a direction toward said valve sleeve.

4. The structure set forth in claim 1 wherein said sleeve is slidable relative to said valve sleeve.

5. The structure set forth in claim 1 wherein said gear reduction member comprises a worm gear.

6. The structure set forth in claim 1 wherein said connection comprises an interface connection comprising a substantially parallel-sided radially disposed slot in one of said members and opened axially toward the other of said members, and means in said slot mechanically connected with the other member including a spring resiliently filling the space between said mechanical means and said slot.

7. The structure set forth in claim 6 wherein said mechanical means comprises a pin carried by said other member and said spring comprises a member biasing said pin against one side of said slot by reaction against the other side of said slot.

8. The structure set forth in claim 6 wherein said mechanical means comprises a slot in the said other member and a block of solid material.

9. The subject matter of claim 3 wherein the diameter of said gear reduction member at its sealing to said sleeve is smaller than the diameter of said valve sleeve member.

10. A resilient universal connection between a pair axially facing worm and valve sleeve members of a power steering gear comprising a slot in one of said members, a pin on the other of said members extending into said slot, and spring means positioned between said pin and one side of said slot constantly biasing said pin against the other side of said slot.